May 19, 1931.   J. W. TATTER   1,805,501
BRAKE BAND
Original Filed Nov. 3, 1926
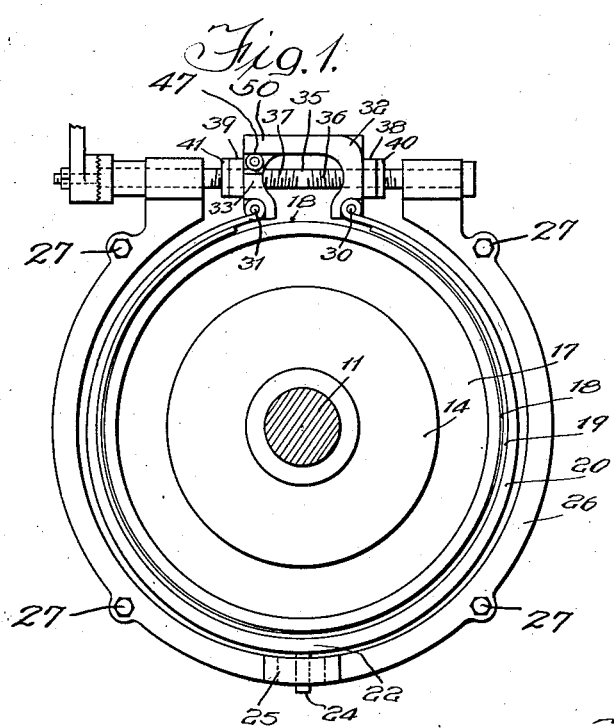
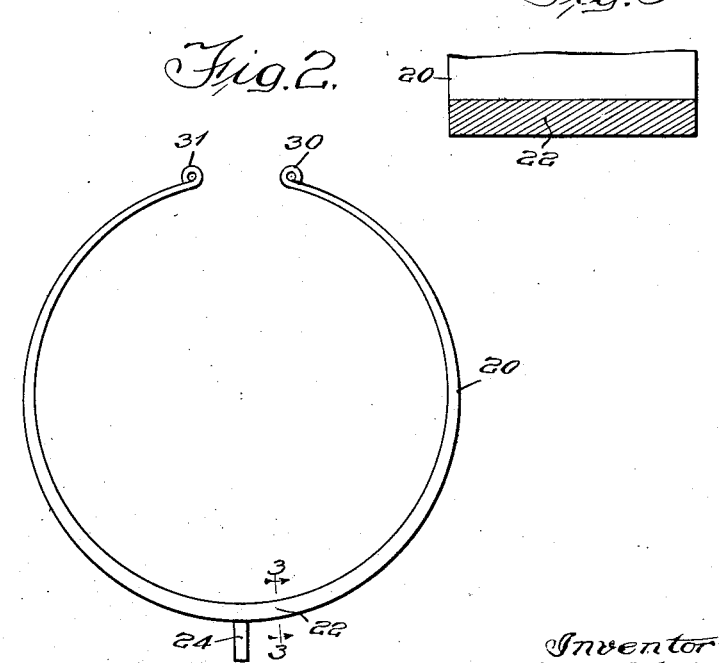
Inventor:
John W. Tatter Patented May 19, 1931

1,805,501

UNITED STATES PATENT OFFICE

JOHN W. TATTER, OF CHICAGO, ILLINOIS, ASSIGNOR TO LEWIS DIFFERENTIAL COMPANY, OF CHICAGO, ILLINOIS, A CORPORATION OF ILLINOIS

BRAKE BAND

Original application filed November 3, 1926, Serial No. 145,970. Divided and this application filed June 10, 1929. Serial No. 369,842.

My invention relates to brake mechanism and has among its objects the production of a device of the kind described which is simple, compact, convenient, durable, efficient and satisfactory for use wherever found applicable.

This application is a division of my pending application, Serial No. 145,970, filed November 3, 1926 for brake mechanisms.

The invention is particularly adapted to be embodied in mechanisms of the kind comprising brake drums and brake bands, or the equivalent, a particular object being to provide an improved brake band for frictionally engaging the brake drum so that the braking effect is applied smoothly and effectively without chattering and without subjecting any particular portion of the brake band to more wear than another portion thereof.

More particularly, it has as an object the production of a brake band which will contract or expand during the braking action in such manner that substantially all of the working surface of the friction lining of the band will uniformly engage the brake drum as distinguished from those bands wherein the end portions engage the brake drum before the central portion of the friction lining comes into engagement therewith.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a view in elevation of my improved band and certain associated parts of the braking mechanism;

Fig. 2 is a view in elevation of the band disassociated from the friction lining and other parts of the brake mechanism and;

Fig. 3 is a sectional view through the band taken substantially on line 3—3 of Fig. 2;

Referring to Figs. 1 and 2 wherein I have shown one form of the invention embodied in braking mechanism particularly adapted to be employed in connection with automobiles, and the like, 11 designates a shaft to be braked as, for example, the propeller shaft of an automobile, this being operatively connected by suitable means not shown to a driven and driving mechanism. The particular shaft 11 shown forms no part of the present invention and need not be described in detail. Constrained to rotate with the shaft or a section secured thereto is a brake drum 17 formed with a cylindrical surface or friction face 18 which is engageable by a friction lining 19, the lining 19 being carried by a flexible arcuate brake band 20. In this instance, the friction lining 19 is secured in any suitable manner to the inner surface of the brake band 20 and the outer surface of the brake band is eccentrically formed with respect to the inner surface. My invention is illustrated in connection with an external contracting type of brake although in principle it is equally effective and applicable to internal expanding types of brakes. Thus, the thickest portion of the brake band 20 is preferably at a point substantially midway between the ends thereof and is designated by the reference character 22. Secured to the portion 22 of the brake band 20 and projecting therefrom is a pin 24 which rides in a slot 25 formed in a brake member 26 which is rigidly secured to the transmission housing or other support by any suitable means such as, for instance, bolts 27, or the equivalent. The slot 25 is arranged circumferentially with respect to the brake band 17 so that the brake band 20 may be displaced circumferentially of the brake drum but cannot move laterally with respect thereto. While the band described may be used associated with any suitable brake mechanism, I have illustrated the same embodied in a mechanism which may be described as follows:

The ends of the brake band 20 are hinged or pivoted by pins 30 and 31 to members 32 and 33, respectively, movable along a rod 35 which is preferably provided with right and left hand screw-threads 36 and 37, respectively. The members 32 and 33 are provided with lugs 38 and 39, respectively, which engage nuts 40 and 41, respectively, and prevent angular displacement of the nuts relative to the members. It will be noted that the nuts 40 and 41 engage the screw-threads 36 and 37, respectively. Obviously, if the rod 35 is rotated in one direction, the nuts 40 and 41 will move toward each other and cause the members 32 and 33 to bring the ends of the brake band 20 toward each other so that the friction lining 19 will engage the face 18 of the brake drum 17. If the rod 35 is rotated in the opposite direction, the nuts 40 and 41 will move away from each other so that the brake band 20 may expand and bring the friction lining 19 out of effective engagement with the brake drum. It is understood, of course, that the brake band 20 is preferably resilient as well as flexible so that it normally assumes a form wherein it will not cause the brake lining 19 to effectively engage the brake drum.

The other parts of the brake mechanism associated with the band need not be described with further detail herein as this mechanism forms part of the separate application of which this is a division.

The operation of the braking mechanism is substantially as follows: Assuming that the several parts of the mechanism are substantially in the positions wherein they are shown in Fig. 2 and that the driver of the automobile wishes to apply a braking action to the shaft, it is obvious that if the driver manipulates suitable mechanism to angularly displace the rod 35 so that the nuts 40 and 41 will move toward each other, the ends of the brake band 20 will be moved toward each other and the lining 19 will engage the brake drum 17 and retard rotation thereof. Because of the fact that the brake band 20 diminishes in thickness from its central portion to its ends or varies in its flexibility between the ends, the brake band will be uniformly contracted in such manner that substantially all of the inner surface of the friction lining 19, will immediately engage the brake drum. This distinguishes from braking apparatus wherein brake bands are provided having substantially the same thickness throughout their lengths, for in such construction, the brake bands tend to bend at first at points disposed substantially midway between their ends, these points being subjected to the greatest leverage. When brake bands first bend at the points located substantially midway between their ends and not contract uniformly, the portions of the friction lining disposed adjacent the ends of the brake bands engage the brake drum before the central portions of the friction lining comes into engagement therewith. Obviously, the end portions of the friction lining will be subjected to more wear than the central portions thereof. Then, because the brake drum is not engaged by substantially the entire friction lining in each instance, the braking action is not efficient. In apparatus embodying the present invention, the friction lining engages the brake drum in such manner that the braking action is smooth.

The construction of the members 32 and 33 is particularly advantageous in that these members can not pivot or rock around the longitudinal axes of the pins 30 and 31 toward each other as the lugs 50 riding upon the anti-friction rollers 47 prevent such movement thereof. It will be readily understood that if the upper portions of the members 32 and 33 could move toward each other without like movement of the lower portions thereof, the ends of the brake band 20 would be moved inwardly toward the brake drum 17 before the portion 22 thereof would bring the central portion of the lining into engagement with the drum.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. A flexible brake band of substantially rectangular cross section which diminishes in cross-sectional area from its central portion to the ends thereof.

2. A flexible brake band which diminishes in its radial cross-sectional dimension from substantially the central portion thereof to the ends thereof.

3. A brake band of the kind described consisting of a split resilient ring, the ring being constructed to provide for relatively greater flexibility adjacent the ends than at any point intermediate its ends.

4. A brake band of the kind described consisting of a strip of resilient material varying substantially uniformly in its flexibility intermediate its ends, whereby upon bringing the ends of the ring together the same contracts substantially uniformly throughout its length.

5. A brake band of the kind described consisting of a split resilient ring, said ring decreasing substantially uniformly in thickness from a point intermediate its ends towards the ends, whereby the same contracts or expands substantially uniformly throughout its length when the ends are brought together or spring outwardly.

6. In a brake, a drum, a substantially circular yielding band diminishing in thickness from substantially the mid-point toward its adjacent ends, friction lining carried by the shoe for engagement with the drum, and means relatively moving said adjacent ends of the shoe.

7. In a brake, a drum, a substantially circular yielding metallic shoe diminishing in thickness from substantially the mid-point toward its adjacent ends whereby the shoe will move concentrically with the drum throughout its length, friction lining of substantially uniform thickness carried by the shoe for engagement with the drum, and brake applying means acting on the said adjacent ends of the shoe.

8. In a brake, a drum, a yielding metallic shoe substantially uniformly diminishing in thickness toward one end thereof whereby the shoe is induced to move concentrically with the drum, friction lining of substantially uniform thickness carried by the shoe for engagement with the drum, and brake applying means acting on said shoe end.

9. In a brake, a drum, a yielding metallic shoe substantially circular in form and substantially uniformly diminishing in its radial cross-sectional dimension towards adjacent ends thereof whereby the shoe is induced to move concentrically with the drum, friction lining of substantially uniform thickness carried by the shoe for engagement with the drum, and brake applying means acting on said adjacent shoe ends.

10. In a brake, a drum, a yielding metallic one-piece shoe substantially circular in form and substantially uniformly diminishing in its radial cross-sectional dimension towards adjacent ends thereof from a point substantially midway of its circumferential length whereby the shoe is induced to move concentrically with the drum, friction lining of substantially uniform thickness carried by the shoe for engagement with the drum, and brake applying means acting on said adjacent shoe ends.

In witness whereof, I hereunto subscribe my name this 5th day of June A. D., 1929.

JOHN W. TATTER.